United States Patent [19]
Kidd

[11] 4,110,739
[45] Aug. 29, 1978

[54] MEANS FOR DETECTING LEAKAGE IN THE INNER LINING OF TANKS AND PIPING

[76] Inventor: John A. Kidd, 9961 Plaza Blvd., Montreal, Quebec, Canada, H1H 4L5

[21] Appl. No.: 710,419
[22] Filed: Aug. 2, 1976
[51] Int. Cl.[2] ............................................. G08B 21/00
[52] U.S. Cl. ........................... 340/605; 73/49.2; 174/120 SC; 174/126 CP
[58] Field of Search ............... 340/242, 235, 244 C; 174/102 SC, 126 CP, 120 SC; 73/40, 40.5, 49.2

[56] References Cited
U.S. PATENT DOCUMENTS

| | | | |
|---|---|---|---|
| 2,165,738 | 7/1939 | Van Hoffen | 174/102 SC |
| 3,252,155 | 5/1966 | Surtees et al. | 340/242 |
| 3,383,863 | 5/1968 | Berry | 340/242 X |
| 3,867,565 | 2/1975 | Prentice et al. | 174/20 SC |
| 3,900,296 | 8/1975 | Kuchek | 174/126 CP |

Primary Examiner—John W. Caldwell, Sr.
Assistant Examiner—Daniel Myer
Attorney, Agent, or Firm—Larson, Taylor and Hinds

[57] ABSTRACT

A laminated vessel or pipe having an outer wall of fibreglass reinforced polyester, an inner wall of corrosion resistant thermoplastic and an electrical conductive layer between the inner and outer walls. A probe of inert material is inserted into the tank or pipe and is connected to a source of electrical power and with an alarm system and the electrical circuit is completed with a connection to the electrical conductive layer in the vessel or pipe.

2 Claims, 7 Drawing Figures

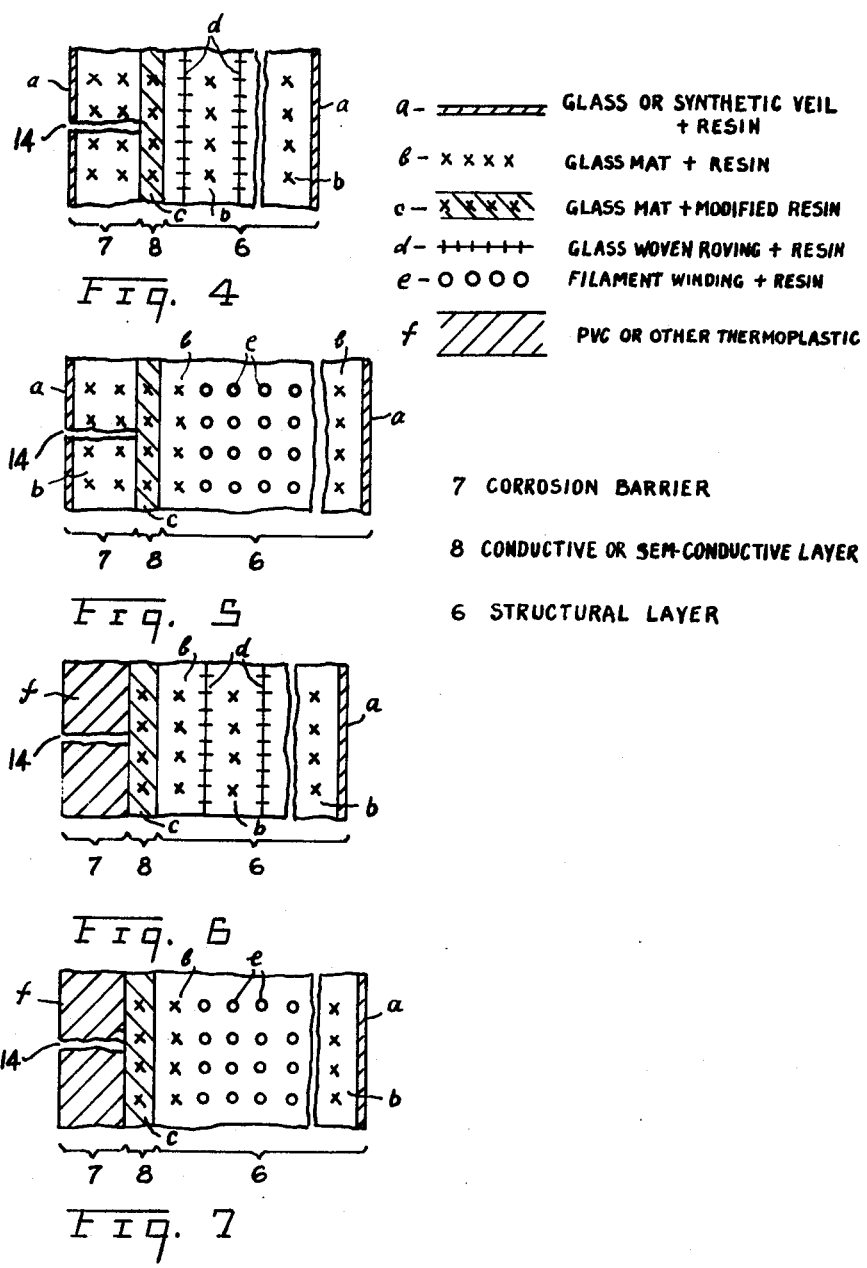

MEANS FOR DETECTING LEAKAGE IN THE INNER LINING OF TANKS AND PIPING

This invention relates to early warning systems for detecting leakage in the inner corrosion resistant barriers or linings of tanks and piping, particularly where the tanks and piping are formed of fibreglass reinforced polyester.

In the last few years, more and more tanks, vessels and piping for the chemical industry have been made of fibreglass reinforced polyester. The success of these structures and, more recently, those made of dual laminate construction consisting of the outer fibreglass reinforced polyester and an inner corrosion resistant barrier has depended to a great extent not only on the chemical resistance of the inner lining, but also on the ability of this inner lining to act as an effective vapour liquid barrier. In other words, even though the fibreglass reinforced polyester forming the outer structure itself may be resistant to the chemical contained within the structure, voids in the inner corrosion resistant barrier or glass exposure may still allow the chemical contents to pass through this inner barrier and weaken the structural layers of the dual laminate structure of the tanks, vessels, piping, etc. At present when the chemical contents do pass through the inner barriers, it may take a period of months or years before it is apparent that there has been penetration of the inner corrosion resistant barriers and the first indication of such penetration is a catastrophic failure or leak through the wall of the tank, vessel or piping.

It has been known to use a metal foil, such as aluminum sheet, as a conducting layer for the detecting of leaks in vessels, etc. However, the use of metal foils has serious disadvantages in that where the contents of the vessel are of a very corrosive material such as an inorganic acid and should this acid leak through the inner lining of the vessel, it will rapidly and preferentially attack the metal foil and leave large areas of the inner lining no longer bonded to the structural outer layer of the vessel. A foil of a metal with similar resistance to PVC would be very expensive and rather defeat the object of using a plastic vessel for containing corrosive chemicals.

In the present invention there is provided between the outer wall of fibreglass reinforced polyester and the inner corrosion resistant barrier, generally of thermoplastic, an electrical conductive or semi-conductive layer incorporating finely divided metals, carbon or graphite. A probe of inert material is inserted into the tank, vessel or piping to be protected and is connected to the one side of a battery, while the other side of the battery is connected through an alarm system to the conductive layer between the outer fibreglass reinforced polyester structure and the inner corrosion resistant barrier. Other sources of power may be used in lieu of a battery. Penetration of a chemical through the inner corrosion resistant barrier at any point will immediately set off the alarm system and corrective measures can be taken at once, such as emptying of the tank or other structure of its chemical contents. Testing for the leak in the inner corrosion resistant barrier can then be achieved by means of a high voltage tester. This is done by scanning the internal surfaces of the inner barrier with the tester and detecting any place were there is a break in the inner lining. Any break in the inner lining can easily be repaired by hot gas welding or by patching with polyester fibreglass in well known manner.

The primary object of the invention is to detect immediately a leak of chemical through the inner corrosion resistant barrier in tanks, vessels, piping, etc. before any serious damage is done to the outer structural layer of the tanks, vessels or piping, and before the chemical has had an opportunity to spread or work down beyond the point of first penetration of the inner lining and to penetrate through the outer fibreglass polyester structure at a distance from the point of actual breakthrough of the inner lining by the chemical.

Reference is made to the attached drawings and the following specification in which.

Figure 1:
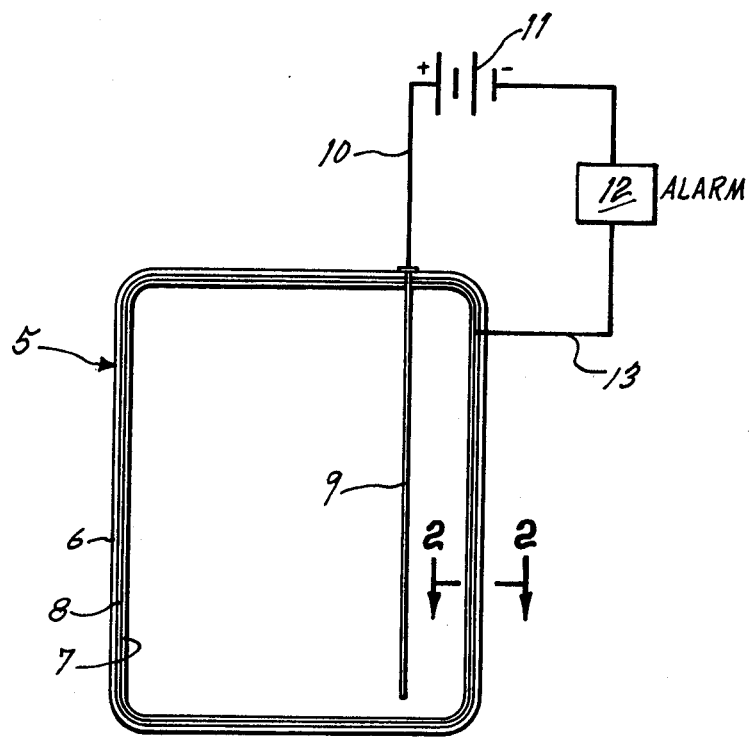
FIG. 1 is a schematic diagram of a lined tank and the alarm system for detecting leakage according to the present invention.
Figure 2:
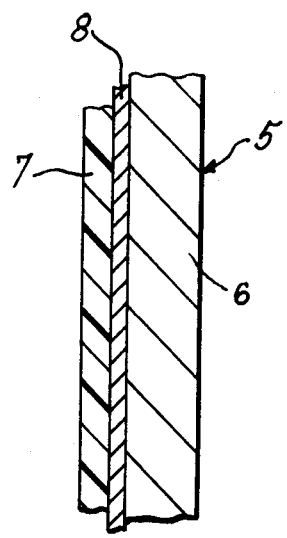
FIG. 2 is an enlarged section of the tank wall taken on the line 2—2 of FIG. 1, showing the inner corrosion resistant barrier, the conductive layer and the tank wall.
Figure 3:
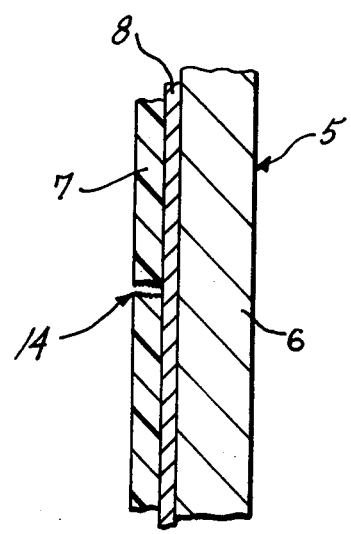
FIG. 3 is a view similar to FIG. 2, but showing a break in the inner corrosion resistant barrier allowing electrolyte to reach the conductive layer.

FIGS. 4 to 7 inclusive are schematic cross section details of alternative laminated construction of the tank walls shown in FIGS. 2 and 3.

Referring to the drawings, the tank 5 is illustrative of any tank or piping having an outer wall 6, an inner corrosion resistant barrier 7 made from fibreglass reinforced polyester or other comparable dual laminate or thermoplastic resistant to the chemicals stored in the tank or piping, and an electrical conductive or semi-conductive layer 8 located between the outer wall 6 and the inner corrosion resistant barrier 7.

The conductive or semi-conductive layer 8 preferably includes finely divided powders or other forms including finely divided metals, carbon or graphite. These can be in the form of a layer on the surface of the inner corrosion resistant barrier 7 opposite from the interior of the tank.

A probe of inert material 9 which is a conductor of electricity such as titanium or platinum is inserted into the tank 5, or pipe and is connected through wire 10 to the positive side of the battery 11, while the negative side of the battery is connected to the alarm system 12 which may be a buzzer, flashing light, or other form of alarm. The electrical circuit is completed by the wire 13 between the alarm system 12 and the conductive or semi-conductive layer 8.

When the electrical circuit is completed by the penetration of electrolyte through a break 14 in the inner corrosion resistant barrier 7, as shown in FIG. 3, the alarm system 12 is set off and immediate steps can be taken to correct the situation before the electrolyte can damage or penetrate the outer wall 6 of the tank or piping 5.

In FIGS. 4 to 6 inclusive there is shown, in schematic cross section, various forms of laminated structures used in tanks and piping formed from fibreglass reinforced polyester and incorporating the inner corrosion resistant barrier 7, the conductive or semi-conductive layer 8, and the outer wall 6 of the tank or pipe 5. In FIG. 4, the conductive or semi-conductive layer 8(c) is laminated between corrosion resistant barrier 7 and the structural layer 6 which is formed of layers of glass woven roving (d) plus resin and a glass mat plus resin (b). In FIG. 5, the conductive layer 8 is laminated between the corrosion resistant barrier 7 and the structural layer 6 which is formed of conductive filament windings (e) between glass mats and resin (b). In FIG. 6, the conductive layer 8 is laminated between the corrosion resistant barrier 7 and alternate layers of glass mats and resin (b), and glass woven roving and resin (d), while in FIG. 7, the conductive layer 8 is laminated between the corrosion resistant barrier 7 and a laminate consisting of glass woven roving (d) between inner and outer layers of glass mats and resin (b).

In operation of this invention, any penetration of electrolyte through the break 14 in the inner corrosion resistant barrier 7, shown in FIG. 3, will activate the alarm system. Immediate steps can then be taken to correct the fault before damage or penetration of the outer wall 6 takes place. The use of finely divided metals, carbon or graphite as a conductive layer 8 on the surface of the inner corrosion resistant barrier 7, remote from the interior of the tank 5, ensures that the alarm system will be activated immediately and that no delamination or disintegration of the structure will take place, as would be the case if a solid or partly solid sheet of metal such as aluminum was used as the conductive layer. Furthermore, with no delamination or disintegration of the conductive layer taking place, spread of the electrolyte and subsequent leakage of the electrolyte through the outer layer 6 of fibreglass reinforced polyester at a point remote from the original leakage through the inner barrier 7 is avoided.

When the inner barrier 7 has been penetrated by electrolyte and the alarm system has been set off, the tank 5 can be emptied and the point of leakage in the inner barrier 7 can be established within minutes by means of a high voltage spark tester. This is done by scanning the internal surface of the inner barrier 7, which is an excellent insulator, and locating the point of leakage by means of a discharge arc. Once the point of leakage through the inner barrier 7 has been located, the inner barrier can easily be repaired by the use of hot gas welding or by the application of a patch of fibreglass reinforced polyester.

The embodiments of the invention in which an exclusive property or privilege is claimed are defined as follows:

1. A vessel for containing liquid chemicals, the said vessel having a laminate wall structure, including an outer structural wall of fibreglass reinforced polyester, an inner corrosion resistant thermoplastic barrier and an electrical conductive layer constructed of finely divided particles contained in a glass mat, said finely divided particles being selected from the group consisting of metals, carbon and graphite, the said conductive layer positioned between the said outer structural wall and the said inner corrosion resistant barrier, an electrical conductive probe extending into the liquid containing interior of the vessel, and an alarm means electrically connected between the probe and the conductive layer and adapted to be activated when the inner corrosion resistant barrier of the vessel is penetrated by the liquid chemical stored within the vessel.

2. A vessel of the type set forth in claim 1 in which the laminated wall structure includes an inner and outer veil of fibreglass.

* * * * *